Jan. 27, 1931.                    W. J. LUFF                    1,790,587
                                    TRAP
                         Filed Feb. 21, 1929        2 Sheets-Sheet 1
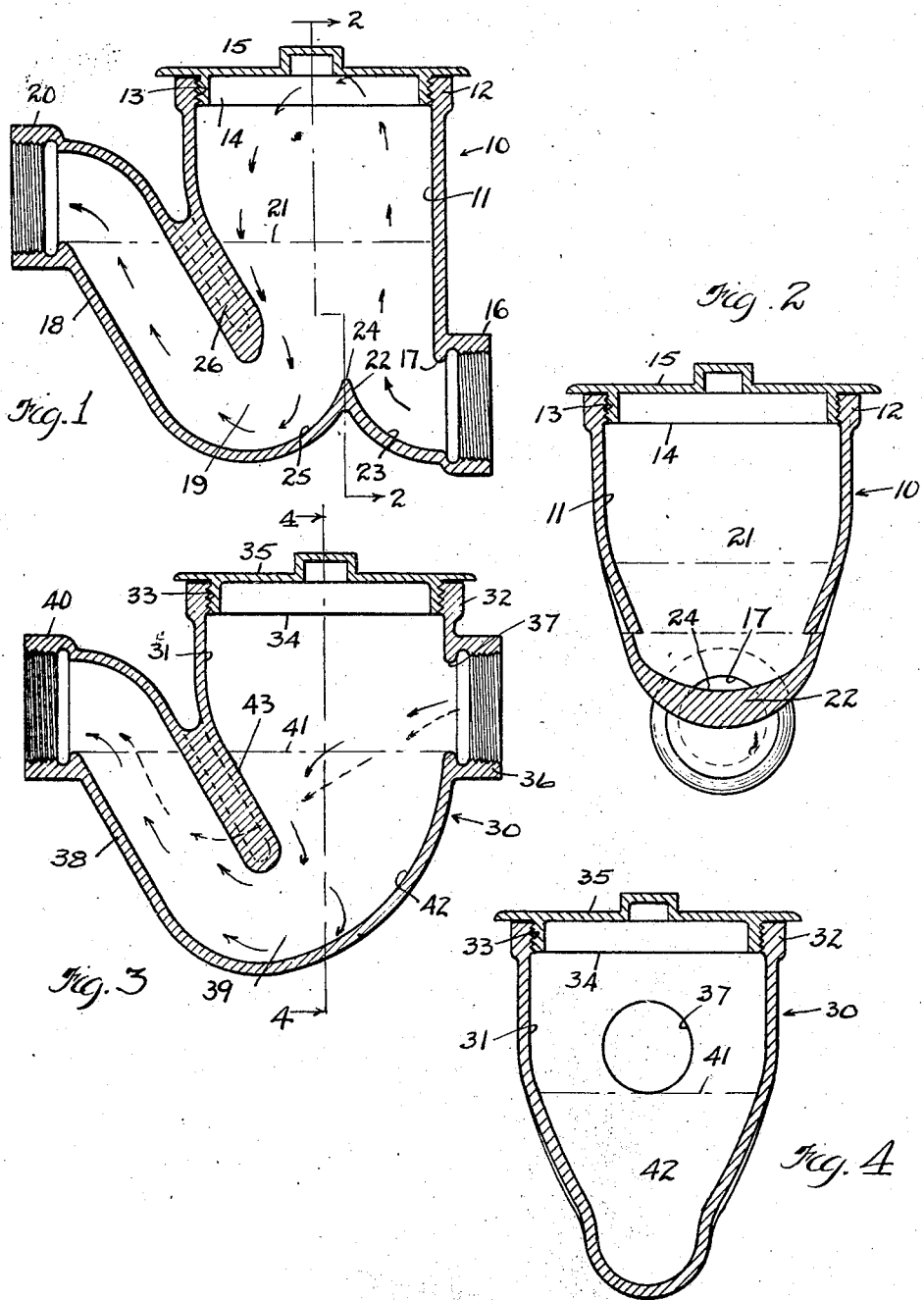
INVENTOR.
Willard J. Luff
BY
Fay, Oberlin & Fay
ATTORNEYS.

Patented Jan. 27, 1931

1,790,587

UNITED STATES PATENT OFFICE

WILLARD J. LUFF, OF CLEVELAND HEIGHTS, OHIO

TRAP

Application filed February 21, 1929. Serial No. 341,825.

The present invention relates, as indicated, to traps, and the primary object thereof is to provide a trap so constructed as to prevent the accumulation therewithin of scums or deposits of soap, grease, and other types of dirt. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 5:
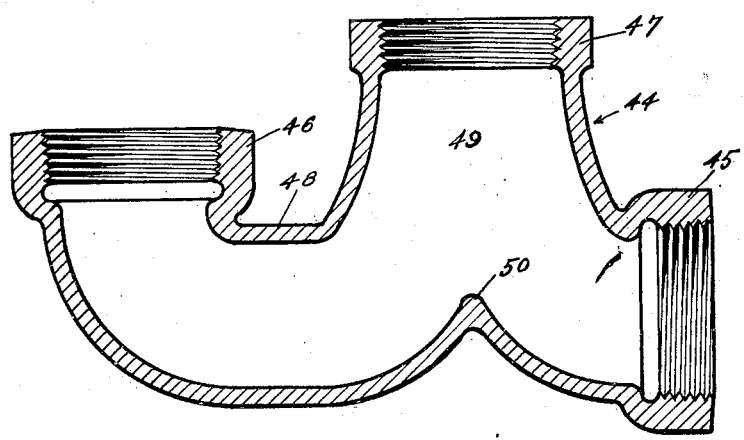
Figure 6:
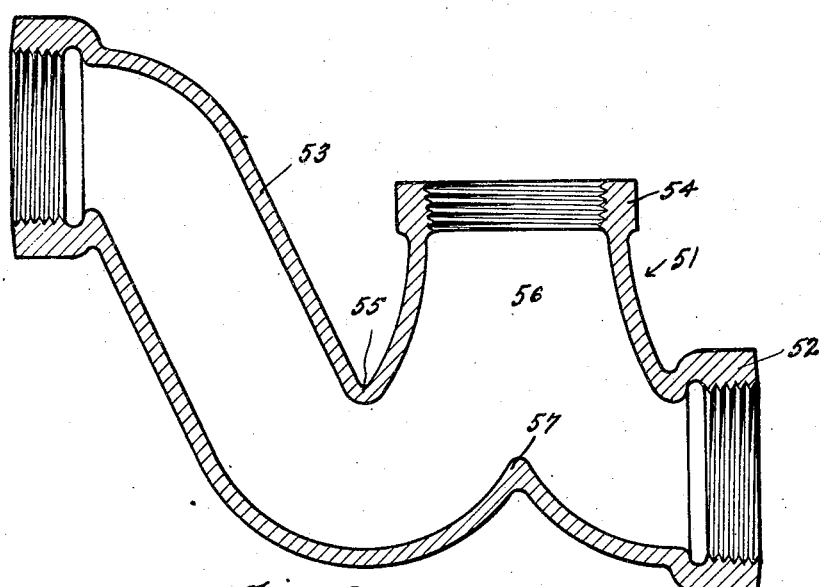

In said annexed drawings:

Fig. 1 is a vertical section through one form of trap according to the present invention; Fig. 2 is a section taken substantially upon the line 2—2 of Fig. 1; Fig. 3 is a section similar to Fig. 1 showing a modified form of trap; Fig. 4 is a section on the line 4—4 of Fig. 3; and Figs. 5 and 6 are vertical sections of two further types of trap members embodying the present invention.

The ordinary drum trap comprises a cylindrical chamber having an outlet conduit opening therein to adjacent the base of the chamber or drum and extending upwardly without the drum to a point adjacent the top of the drum; and having an inlet port opening into the drum either adjacent the base thereof or substantially on the level of the upper end of the outlet conduit. In the former type of trap, where it is applied to a bath tub drain, for instance, a very serious disadvantage exists. After a tubful of water has been used and the drain for the tub is opened, water flows at a high velocity into the drum through the inlet thereto. This high velocity liquid sweeps directly across the bottom of the drum to the outlet, scarcely ruffling the surface of the liquid in the trap. As the bath tub is drained, the head on the drain is reduced, and consequently the velocity of the liquid flowing to the trap is reduced. As the last few quarts of liquid run out of the tub, they are under the influence of a very low head, and consequently their velocity as they enter the trap is very low. These last few quarts, furthermore, carry practically all of the solid matter in the tub, and this solid matter, which is lighter than the liquid, will tend to rise in the drum of the trap. As a consequence, after months or years of use, a fairly thick scum of soap, grease, and other dirt gathers upon the surface of the liquid standing in the trap. Furthermore, as the first rush of liquid enters the drum, a pressure is built up in the drum which compresses the air therein above the liquid level. This, of course, results in the solution of a certain amount of air in the liquid in the trap, and a reduction of the pressure within the trap when the tub has been emptied. Consequently, after a long period of use, the normal liquid level in the drum is materially raised, and sometimes this level is raised to such an extent that the scum on the top of the liquid comes into actual contact with the lower face of the clean-out plug and a deposit is formed thereon.

In the latter type of trap, the liquid discharged from the tub tends to flow practically in a straight line from the inlet opening to the point at which the outlet conduit enters the drum, and any heavy material which may be carried by the stream tends to fall as a silt into the corner of the drum adjacent the wall through which the inlet enters the drum. It has been found that, after long periods of use, very material deposits of silt are present in traps of this type.

In Figs. 1 and 2 there is illustrated a drum 10 of the general class of the type first described above, but modified in accordance with my invention. Said trap is formed to provide a chamber or drum 11 having an open upper end 12 internally threaded as at 13 for the reception of the threaded annular flange 14 of a clean-out plug 15. An inlet 16 opens into said drum adjacent the base thereof as at 17, and an outlet conduit 18 opens into said drum adjacent the base thereof as at 19 and extends upwardly without the drum as shown, the upper free end 20 of the conduit 18 being on a level adjacent the upper end 12 of the drum. Because of this construction, liquid will normally stand in the drum 11 at the level indicated by the dotted line 21.

Between the points 17 and 19 the base of the drum is formed with a baffle 22, and it will be noted that said base is formed to provide a smoothly curved wall 23 extending from the bottom of the inlet opening 17 to the peak 24 of the baffle 22; and to provide a smoothly curved wall 25 from the peak 24 of the baffle 22 to the bottom of the port 19 through which the outlet conduit 18 opens into the drum 11.

As a consequence of this construction, when the drain of a substantially filled bath tub is opened, liquid will rush through the port 17 and will be deflected by the curved wall 23 and baffle 22 substantially along the lines indicated by the arrows in Fig. 1. Since this liquid is entering the trap at a high velocity, it will be thrown, by the wall 23, beyond the level 21 of the liquid in the drum, and sometimes will be caused to sweep across the inner face of the clean-out plug 15. The liquid is deflected from the plug 15 and falls along the lines indicated by the arrows, and the wall 26 deflects the stream of liquid slightly back toward the inlet opening 17 to cause the same to strike the wall 25 which deflects the stream through the opening 19 into the outlet conduit 24. As the velocity of the incoming material decreases, the height to which the same is thrown within the drum is, of course, decreased. The final drainings probably will not be thrown above the level of the liquid in the drum, but even they will probably cause a certain amount of roiling of such surface. As will be obvious, the solid matter carried by the last few quarts of liquid will, even in this construction, rise to a float upon the surface of the liquid in the trap, but this matter will be carried off with the next discharge of liquid at a relatively high velocity through the trap.

In Figs. 3 and 4, there is illustrated a trap 30 of the general class second described above. This unit comprises a casing forming a chamber or drum 31 having an open upper end 32 internally threaded as at 33 for the reception of a threaded annular flange 34 of a clean-out plug 35. An inlet 36 opens as at 37 into said drum, and an outlet conduit 38 opens at 39 into the drum adjacent the base thereof. The upper end 40 of the conduit 38 is disposed on substantially the same level as the inlet 36 so that the liquid level 41 in the drum stands substantially at the bottom of the inlet opening 37. In Fig. 3, dotted arrows indicate generally the direction of flow of liquid in an ordinary drum trap of this class, while solid line arrows indicate the direction of flow of liquid in the illustrated trap. As illustrated, liquid flowing through the trap sweeps the curved wall 42 which extends upon a smooth curve from the bottom of the inlet opening 37 to the bottom of the outlet opening 39, the liquid being directed against this wall by the baffle 43 within the drum.

Referring now to the modifications illustrated in Figs. 5 and 6, it will be seen that in Fig. 5, I have shown a trap member indicated generally at 44 and provided with an inlet hub 45, a vertically disposed outlet hub 46, and a clean-out hub 47 disposed between the inlet and outlet. A partition 48 separates the outlet passage from the main body 49 of the trap member thereby providing for a liquid seal to stand in said body 49. A baffle 50 is provided between the inlet and outlet hubs and substantially on the center line of the body portion 49. The action of the baffle 50 is substantially the same as that of the baffle 22 in the modification illustrated in Fig. 1.

In Fig. 6, I have illustrated a trap member 51 having an inlet hub 52 and an outlet conduit 53, the outer end of which is disposed at a level above the base of the threads in the clean-out opening 54 so that the liquid seal stands normally in the body portion 56 just below the upper end of the hub 54, such seal being provided for by the partition 55. In this modification, again, I have provided a baffle 57 substantially on the center line of the body portion 56 which, as in the previously described modifications, makes the trap self-cleaning.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a drum-type trap, a closure plate for the top of the drum, an inlet opening into the drum adjacent the base thereof, an outlet conduit opening into said drum adjacent the base thereof and extending outwardly and upwardly to the approximate level of the top of said drum, whereby liquid is caused to stand in said drum at a level above said inlet opening, and a curved upwardly projecting flange in the bottom of said drum opposite said inlet opening adapted to cause material entering through said opening to sweep the inner face of said closure plate.

2. A trap of the class described comprising a casing with wall portions forming a chamber having a removable closure at its upper extremity, said chamber having an inlet opening adjacent the lower extremity of one of its side wall portions, means directly associated with said inlet opening for directing flow upwardly along said side wall portion, said chamber having an outlet opening adjacent the lower extremity of its side wall portion opposite said inlet opening, and an outlet passage leading from said outlet opening to an outlet connection at its outer end, said outlet passage having its top wall portion above the level of the bottom of said inlet opening, and said outlet passage having the uppermost elevation of its bottom wall portion above the lowermost elevation of its top wall portion.

3. A trap of the class described comprising a casing with wall portions forming a chamber having a removable closure at its upper extremity, said chamber having an inlet opening adjacent the lower extremity of one of its side wall portions, means directly associated with said inlet opening for directing flow upwardly along said side wall portion, said chamber having an outlet opening adjacent the lower extremity of its side wall portion opposite said inlet opening, and an outlet passage leading from said outlet opening to an outlet connection at its outer end, said outlet passage having its top wall portion above the bottoms of said inlet opening and said outlet opening, and said outlet passage having the uppermost elevation of its bottom wall portion above the lowermost elevation of its top wall portion.

4. A trap of the class described comprising a casing with wall portions forming a chamber having a removable closure at its upper extremity, said chamber having an inlet opening adjacent the lower extremity of one of its side wall portions, an inlet passage leading to said inlet opening from an inlet connection at its outer end and formed to direct flow therethrough upwardly along said side wall portion, said chamber having an outlet opening adjacent the lower extremity of its side wall portion opposite said inlet opening, and an outlet passage leading from said outlet opening to an outlet connection at its outer end, said inlet passage and said outlet passage having the lowermost elevation of their top wall portions at substantially the same level, said outlet passage having its top wall portion above the bottoms of said inlet opening and said outlet opening, and said outlet passage having the uppermost elevation of its bottom wall portion above the lowermost elevation of its top wall portion.

5. A trap of the class described comprising a casing forming a chamber having a removable closure at its upper extremity, an inlet opening adjacent the bottom of said chamber, means for directing flow from said inlet upwardly into said chamber toward said closure, said chamber also having an outlet opening adjacent its bottom portion, and an upwardly directed passage from said outlet leading to an outlet connection, said passage having one portion of the wall thereof above the lower level of said inlet and another portion at the point of connection above the level of said first portion.

Signed by me this 16th day of February, 1929.

WILLARD J. LUFF.